J. P. EUSTIS.
METHOD OF MAKING JOINTS FOR WIRES OR RODS.
APPLICATION FILED OCT. 21, 1909.
1,045,383.
Patented Nov. 26, 1912.
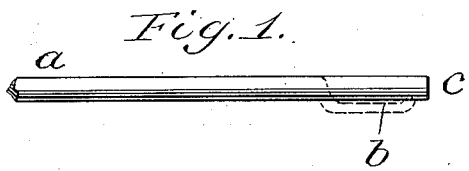
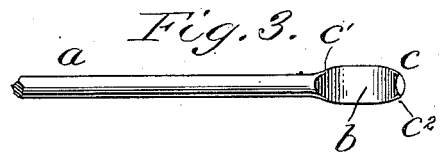
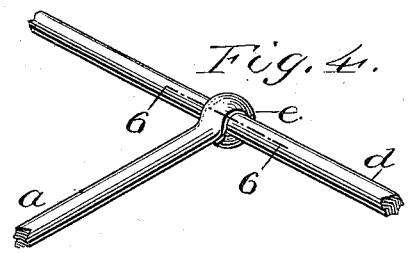
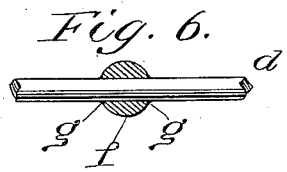
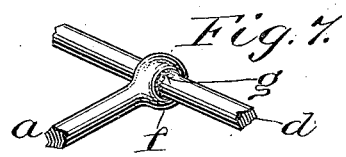

UNITED STATES PATENT OFFICE.

JOHN P. EUSTIS, OF NEWTON, MASSACHUSETTS.

METHOD OF MAKING JOINTS FOR WIRES OR RODS.

1,045,383.   Specification of Letters Patent.   Patented Nov. 26, 1912.

Original application filed March 13, 1909, Serial No. 483,234. Divided and this application filed October 21, 1909. Serial No. 523,892.

*To all whom it may concern:*

Be it known that I, JOHN P. EUSTIS, a citizen of the United States of America, residing at Newton, Middlesex county, Massachusetts, have invented certain new and useful Improvements in Methods of Making Joints for Wires or Rods, of which the following is a specification.

This invention relates to methods of making joints for wires or rods, and has for its object the production of a relatively broad joint between two right-angularly connected wires or rods, as in sponge-holders, soap-holders and other wire goods.

This application is a division of applicant's prior application, Ser. No. 483,234, filed March 13, 1909.

The particular object of the invention is to provide an improved method for the production of a ball-like effect at such joints, in which the ball is relatively wide as compared with the width of the wire or rods used. This is not new of itself, but the manner in which the effect is produced is simpler and more efficient than any other of which I am aware. There are a number of methods open to use at the present time for making joints for wires as follows: A rod is drilled transversely and the end of a wire of less diameter is set in the hole. Or, a turned ball having one hole drilled clear through and another hole drilled half way through at right angles to the other hole is used and the wires to be joined are set in these holes. Or, an eyelet is soldered to the end of a wire and the flange formed up to fit the circumference of the rod at right angles to it. Or, the end of a wire or rod is forged or rolled to reduce said end and to broaden it relatively to the wire, so as to produce a cross section in which there are flat edge-portions and an intermediate convex portion of the same width as the original wire or rod.

The method forming the subject of this invention is wholly different therefrom and these differences will be made apparent by the drawings, specification and claim. The steps of the method are illustrated in the accompanying drawings in which—

Figure 1 is a side view of wire showing in dotted lines how one end portion is swaged or rolled in the first step of the method to depress or offset and flatten it at one side; Fig. 2 is a side view showing in full lines how the wires should be swaged; Fig. 3 is a top view of the swaged or rolled wire; Fig. 4 is a perspective view of two wires joined at right angles at the end of the second step of the method; Fig. 5 is a side view of the swaged wire shown in Fig. 2, after the eye has been formed by the second step of the method; Fig. 6 is a section on line 6—6, Fig. 4, after the step of soldering the parts, and Fig. 7 is a perspective view of the complete joint.

Referring to the drawings, an end-portion $c$ of a wire or rod $a$ of malleable metal is subjected to the action of suitable tools, to reduce its thickness considerably, expand it in width and to depress or offset and flatten one side of it at $b$, and to produce a convexity $f$ on the other surface. The result of this action is shown by dotted lines in Fig. 1, and in full lines in Figs. 2 and 3. It will be seen that the flattened end-portion $c$ is simultaneously therewith bent out of axial alinement with the wire $a$. Also, that the width of the intermediate part of the end-portion is considerably greater than the diameter of the wire. It follows that the widths of the flat surface $b$ and the convex surface $f$ are greater than the wire. At the same time, the terminals $c'$, $c^2$, of said end-portion $c$ are each formed with a taper. This deformation of the end-portion of the wire so that the convex surface $f$ extends from edge to edge of said end-portion is preferably performed by a swaging operation in a suitable press, and is the result of the bi-lateral cold-flowing of the metal.

The formed wire $a$ is then put into a suitable press, not shown, with another wire $d$ at right angles to it so that the end-portion $c$ may be closed over the wire $d$ to form an eye $e$, Figs. 4 and 5, and the two wires will lie in substantially the same plane. The end-portion $c$ is thus wrapped around the wire $d$, the flat side $b$ being on the inside and the round surface $f$ outside. When the eye $e$ has been formed it will be seen that the tapered lengths $c'$, $c^2$ of the body of the eye merge into the body of the wire. The parts are then united in such a way, if the best effect is desired, by solder $g$, that a ball-like effect is produced, which in finished or nickeled articles is quite like or indistinguishable from a ball.

A joint so produced is solid and substantial when made with proper dies. It is less expensive than the use of balls, looks better than eyelets, and is cheaper than drilling and inserting wires.

What I claim is:—

The method of producing a joint eye on a wire or rod, which consists in depressing or offsetting, and flattening a part of the wire or rod relatively to the longitudinal axis thereof so as to expand it in width and form a convex surface of greater width than the wire or rod, having tapering inner and outer ends, and then bending said part so as to provide a ball-shaped eye of greater diameter than the wire or rod, the tapering inner and outer ends being merged into the body of the rod.

JOHN P. EUSTIS.

Witnesses:
F. A. COAN,
T. M. KEEFE.

Copies of this patent may be obtained for five cents each, by addressing the "Commissioner of Patents, Washington, D. C."